(12) United States Patent
Van Rooyen et al.

(10) Patent No.: US 10,614,923 B2
(45) Date of Patent: Apr. 7, 2020

(54) METHODS OF FORMING STRUCTURES AND FISSILE FUEL MATERIALS BY ADDITIVE MANUFACTURING

(71) Applicant: BATTELLE ENERGY ALLIANCE, LLC, Idaho Falls, ID (US)

(72) Inventors: Isabella J. Van Rooyen, Ammon, ID (US); Sean R. Morrell, Ammon, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 241 days.

(21) Appl. No.: 15/653,258

(22) Filed: Jul. 18, 2017

(65) Prior Publication Data

US 2018/0025797 A1    Jan. 25, 2018

Related U.S. Application Data

(60) Provisional application No. 62/363,964, filed on Jul. 19, 2016.

(51) Int. Cl.

| | |
|---|---|
| *G21C 3/02* | (2006.01) |
| *G21C 21/02* | (2006.01) |
| *G21C 3/16* | (2006.01) |
| *G21C 3/62* | (2006.01) |
| *B28B 1/00* | (2006.01) |
| *B33Y 10/00* | (2015.01) |
| *B33Y 80/00* | (2015.01) |

(Continued)

(52) U.S. Cl.
CPC .............. *G21C 21/02* (2013.01); *B28B 1/001* (2013.01); *B29C 64/153* (2017.08); *B29C 64/268* (2017.08); *B33Y 10/00* (2014.12); *B33Y 70/00* (2014.12); *B33Y 80/00* (2014.12); *G21C 3/044* (2013.01); *G21C 3/16* (2013.01); *G21C 3/62* (2013.01); *G21C 3/623* (2013.01); *G21C 3/626* (2013.01); *Y02E 30/38* (2013.01)

(58) Field of Classification Search
CPC ..... B28B 1/001; B29C 64/141; B29C 64/153; B29C 64/268; G21C 21/02
USPC .................................................. 264/0.5, 497
See application file for complete search history.

(56) References Cited

U.S. PATENT DOCUMENTS

| | | |
|---|---|---|
| 4,060,454 A | 11/1977 | Miertschin et al. |
| 4,493,814 A | 1/1985 | Beard, Jr. et al. |

(Continued)

OTHER PUBLICATIONS

Dejonghe et al., "Sintering of Ceramics", Handbook of Advanced Ceramics, Chapter 4, CRC Press, Taylor & Francis Group, (2003) pp. 187-264.

(Continued)

*Primary Examiner* — Leo B Tentoni
(74) *Attorney, Agent, or Firm* — TraskBritt

(57) ABSTRACT

A method of forming one or more structures by additive manufacturing comprises introducing a first layer of a powder mixture comprising graphite and a fuel on a surface of a substrate. The first layer is at least partially compacted and then exposed to laser radiation to form a first layer of material comprising the fuel dispersed within a graphite matrix material. At least a second layer of the powder mixture is provided over the first layer of material and exposed to laser radiation to form inter-granular bonds between the second layer and the first layer. Related structures and methods of forming one or more structures are also disclosed.

33 Claims, 8 Drawing Sheets

(51) Int. Cl.
  *B33Y 70/00* (2020.01)
  *G21C 3/04* (2006.01)
  *B29C 64/268* (2017.01)
  *B29C 64/153* (2017.01)

(56) References Cited

U.S. PATENT DOCUMENTS

| | | |
|---|---|---|
| 5,155,324 A | 10/1992 | Deckard et al. |
| 5,231,261 A | 7/1993 | Duthoo |
| 5,309,493 A | 5/1994 | Kamimura et al. |
| 7,258,720 B2 | 8/2007 | Fuwa et al. |
| 2007/0064861 A1 | 3/2007 | Sterbentz |
| 2011/0049739 A1* | 3/2011 | Uckelmann ........... B29C 64/153 264/16 |
| 2015/0078505 A1 | 3/2015 | Xu et al. |
| 2015/0098546 A1 | 4/2015 | Xu et al. |
| 2017/0304894 A1* | 10/2017 | Buller .................. B29C 64/153 |

OTHER PUBLICATIONS

LENS 850-R Product Brochure from Optomec Inc., www.optomec.com, (Jan. 2015) 2 pages.

Murali et al., "Direct selective laser sintering of iron-graphite powder mixture", Journal of Materials Processing Technology, vol. 136 (2003) pp. 179-185.

Ohata et al., "Studies on laser defocusing effects on laser ablation inductively coupled plasma-atomic emission spectrometry using emission signals from a laser-induced plasma", Spectrochimica Acta, Part B, 57 (2002) pp. 1713-1725.

Unt et al., "Effects of sealing run welding with defocused laser beam on the quality of T-joint fillet weld", Physics Procedia, vol. 56 (2014) pp. 497-506.

\* cited by examiner

METHODS OF FORMING STRUCTURES AND FISSILE FUEL MATERIALS BY ADDITIVE MANUFACTURING

CROSS-REFERENCE TO RELATED APPLICATION

This application claims the benefit of U.S. Provisional Patent Application Ser. No. 62/363,964, filed Jul. 19, 2016, and entitled "METHODS OF FORMING STRUCTURES AND FISSILE FUEL MATERIALS BY ADDITIVE MANUFACTURING AND RELATED STRUCTURES," the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to methods of additively manufacturing one or more structures. More particularly, embodiments of the disclosure relate to methods of forming fissile fuel structures, such as fuel blocks, fuel elements, fuel assemblies, and reactor cores by additive manufacturing and to related structures.

BACKGROUND

Fuel blocks, fuel elements, fuel assemblies, and other structures that are used in nuclear reactor cores are generally formed by extrusion or sintering processes. Such processes include preparation of powders that will form the structures and formation of a die through which the powder will be extruded or in which the powder will be compacted and sintered.

After powder preparation, extrusion includes mixing the powders with a binder material, a resin, a lubricant, or combinations thereof and extruding the mixture through a die having a cross-sectional shape of a final structure. The extruded product (i.e., the extrudate) may then be machined to a desired final size and shape.

Alternatively, structures may be formed by compacting a powder mixture into a mold or die and sintering the powder mixture to form a final structure. Such sintering processes often include adding a resin material, a binder material, or a combination thereof to the powder mixture to facilitate formation of a green structure to be sintered. The resin or binder material may comprise, for example, a high molecular weight material, such as a high molecular weight poly (ethylene oxide), a coal tar pitch (CTP) material, other binder materials, or combinations thereof. After the materials are pressed in the mold, the materials are generally heated under high-temperature and high-pressure (HTHP) conditions to form inter-granular bonds between individual grains of the powder material.

Unfortunately, the resin materials and/or binder materials used in sintering or extrusion processes are often undesirable in the final structure. For example, resin or binder materials in an extrudate may increase a likelihood of surface cracking and internal cracking of the extrudate. Resin and binder materials are frequently outgassed from a sintered structure. However, outgassing of the resin or binder material may form pores in the sintered structure, reducing a total density of the final structure. In some instances, outgassing may also cause cracks in the structure. In addition, the resin and binder materials may also reduce a purity of the final structure.

BRIEF SUMMARY

In accordance with one embodiment described herein, a method of forming a fissile fuel structure by additive manufacturing comprises introducing a first layer of a powder mixture comprising graphite and a fuel on a surface of a substrate, at least partially compacting the first layer, exposing the first layer of the powder mixture to laser radiation to form a first layer of material comprising the fuel dispersed within a graphite matrix material, forming a second layer of the powder mixture over the first layer of material, and exposing the second layer of the powder mixture to laser radiation to form a second layer of material comprising the fuel dispersed within a graphite matrix material and to form inter-granular bonds between the second layer and the first layer.

In additional embodiments, a method of additively manufacturing a structure comprises disposing a first layer of a powder onto a surface of a substrate, compacting the first layer of the powder on the surface of the substrate, exposing the first layer of the powder to defocused laser radiation to form a first layer of a structure comprising inter-granular bonds between particles of the powder, disposing a second layer of another powder on the first layer of the structure, and exposing the second layer of the another powder to defocused laser radiation to form a second layer of the structure.

In further embodiments, a method of forming a structure comprises providing a substrate within an enclosure, disposing a powder on the substrate, exposing the powder on the substrate to defocused laser radiation to form a first layer of a structure, disposing additional powder over the first layer, and exposing the additional powder over the first layer to defocused laser radiation.

In yet additional embodiments, a structure including a fissile fuel material comprises at least a first layer comprising a fuel material dispersed in a graphite matrix material, wherein particles of the fuel material are directly bonded to adjacent particles of the graphite matrix material, the fissile fuel material exhibiting a graphite to total carbon ratio equal to about 1.0:1.0, and at least a second layer of another material bonded to the first layer.

DETAILED DESCRIPTION

Figure 1A:
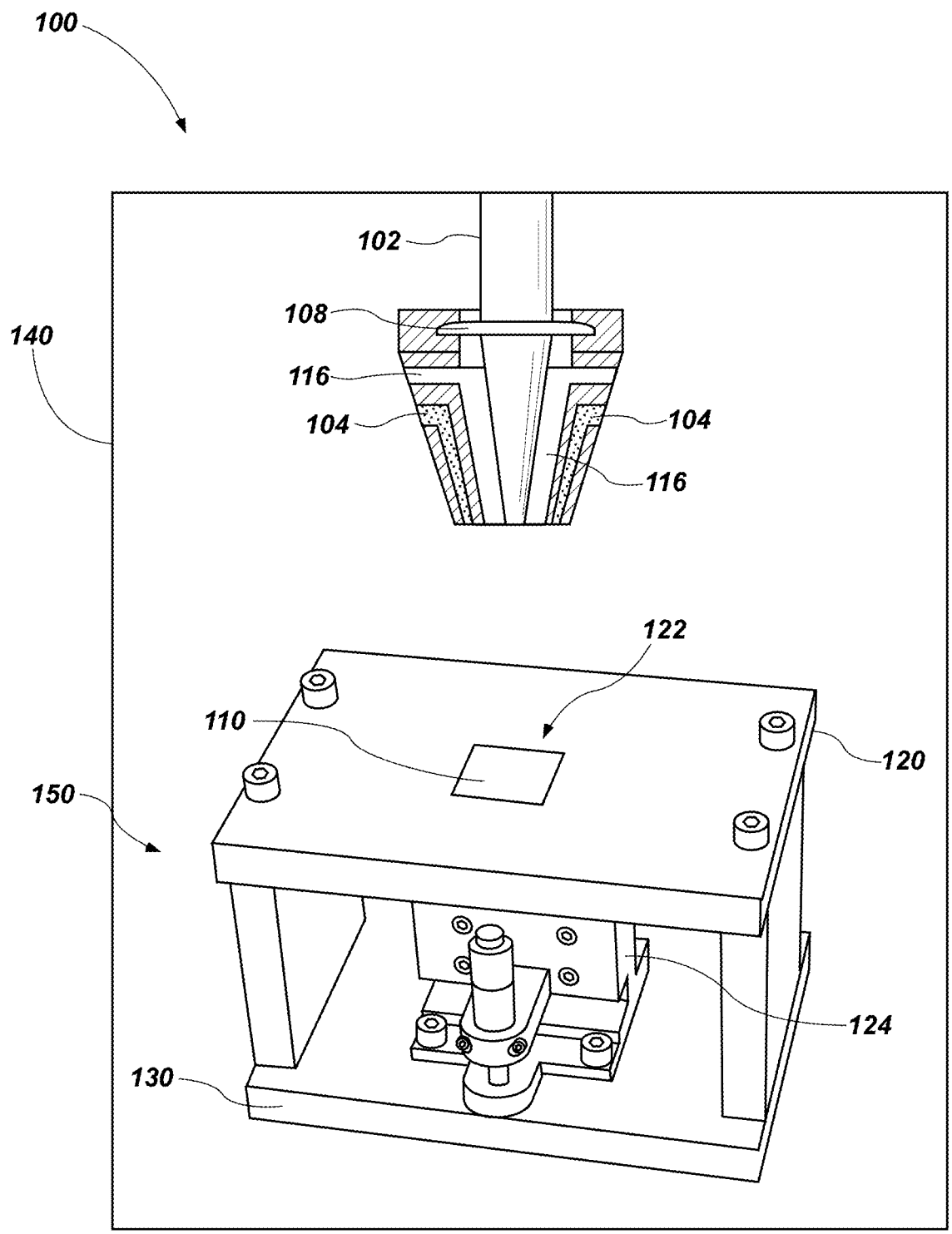
FIG. 1A is a perspective views of a tool configured to form a structure in accordance with the methods described herein.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a structure (e.g., one or more of fuel blocks, fuel elements, fuel assemblies, or reactor cores) using additive manufacturing. Only those process acts and structures necessary to understand the embodiments of the disclosure are described in detail below. Additional acts to form a final structure including the materials and methods described herein may be performed by conventional techniques. Also note, any drawings accompanying the present application are for illustrative purposes only, and are thus not drawn to scale. Additionally, elements common between figures may retain the same numerical designation.

According to methods described herein, a structure may be formed by additive manufacturing. In some embodiments, the structure may be formed without a binder or resin material, such as those that are conventionally used during fabrication of similar structures using extrusion or sintering processes. In some embodiments, the structures may include an increased graphite content compared to structures that are formed by extrusion or sintering. In some embodiments, the structure comprises a graphite to total carbon ratio equal to about 1.0:1.0. Stated another way, substantially all of the carbon in the structure may be graphitic carbon. The increased graphite content may increase a thermal conductivity of the structure compared to structures having a lower graphite content. The increased thermal conductivity may increase a heat transfer from the structure to surrounding materials (e.g., such as in a nuclear reactor core). In some embodiments, the structure comprises a fuel block or a fuel element and the increased thermal conductivity enables a lower cladding temperature of cladding surrounding the structure during use and operating. The reduced operating temperature may substantially reduce oxidation of the cladding material. In addition, structures formed according to the methods described herein may be formed at lower temperatures and pressures than those encountered during extrusion or sintering processes.

As used herein, the term "uranium-containing material" means and includes any material that includes uranium such as, for example, low-enriched uranium dioxide ($UO_2$), a uranium oxide (e.g., $U_3O_8$), uranium silicide ($U_3Si_2$), uranium carbide (UC), uranium carbide oxide (UCO), a highly-enriched uranium oxide, uranium-molybdenum fuels (U—Mo) and alloys thereof, uranium-beryllium ($UBe_x$) and oxides thereof (e.g., BeO—$UO_2$), or other material including uranium.

Figure 1B:
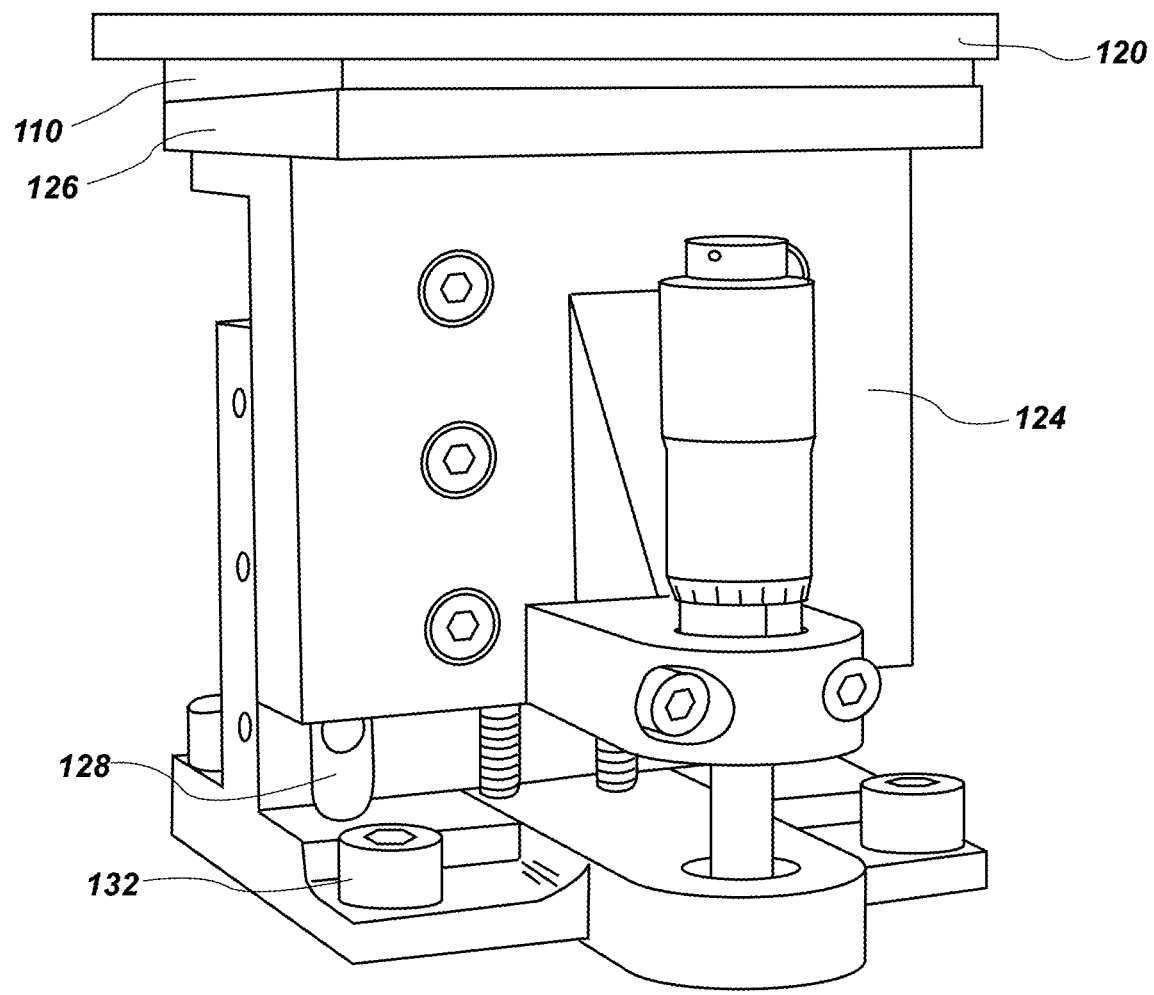
FIG. 1B is a perspective view of a z-axis of the tool of FIG. 1A.

FIG. 1A and FIG. 1B are perspective views of a tool 100 configured to additively manufacture one or more structures according to embodiments of the disclosure. The tool 100 may be configured to provide a layer of a powder material over a substrate 110 and expose the powder layer to laser radiation to form a layer of the structure being formed, provide and expose to the laser radiation another powder layer over the previously formed layer of the structure and repeat the process until a desired near net shape of a final structure is formed.

With reference to FIG. 1A and FIG. 1B, the tool 100 may include a carrier assembly 150 configured to carry a substrate 110. The carrier assembly 150 may include an aperture plate 120 having an aperture 122 therein. As illustrated in FIG. 1A, the aperture 122 may be sized and shaped to receive the substrate 110 therein. A cross-sectional shape of the aperture 122 may be rectangular, square, circular, semi-circular, truncated versions thereof, or an irregular shape. In some embodiments, the cross-sectional shape of the aperture 122 may substantially correspond to a cross-sectional shape of a structure being formed and may include, for example, a cross-sectional shape of a fuel block, a fuel element, a portion of a fuel assembly or a fuel core, or a combination thereof. However, the disclosure is not so limited and the cross-sectional shape of the aperture 122 may include any shape and may be different than the cross-sectional shape of the structure being formed.

The substrate 110 and aperture plate 120 may underlie a laser 102 and one or more powder delivery nozzles 104. The powder delivery nozzles 104 may be configured to provide a powder material to the substrate 110 to form a powder layer thereon. In some embodiments, the powder delivery nozzles 104 may be configured to provide the powder layer to the substrate 110 coaxially with laser radiation from the laser 102. Each of the powder delivery nozzles 104 may be configured to provide a powder material having a different composition than a powder material provided by the other powder delivery nozzles 104. In some embodiments, the powder may be fed to the powder delivery nozzles 104 by gravity. In other embodiments, the powder may be fed with an inert carrier gas, such as, for example, nitrogen, argon, helium, another inert carrier gas, or combinations thereof. Although FIG. 1A illustrates two powder delivery nozzles 104, the tool 100 may include one powder delivery nozzle 104 or more than two powder delivery nozzles 104 (e.g., three, four, etc.). A shield gas, which may comprise, for example, one or more of the carrier gases (e.g., nitrogen, argon, helium, etc.) configured to shield the powder layer from, for example, oxygen, or to promote layer to layer adhesion may be provided through shield gas ports 116. Although not shown, the powder delivery nozzles 104 may be operably coupled to a powder source and the shield gas ports 116 may be operably coupled to a shield gas source.

The laser 102 may be configured to direct electromagnetic radiation (e.g., laser radiation) through a lens 108 and to the powder layer over the substrate 110. Responsive to exposure to heat provided by the laser radiation, individual particles of the powder layer may form inter-granular bonds with each other and with previously formed layers of the structure previously exposed to the laser radiation.

The lens 108 may comprise a focusing lens and may be positioned to focus laser radiation from the laser 102 a predetermined distance from the laser 102. As will be described herein, the laser 102 may be configured to be defocused such that the laser radiation provided to the powder over the substrate 110 is defocused and dispersed over a relatively larger area than a conventional focused laser.

The substrate 110 may be attached to a table 126 of a z-stage 124 of the tool 100. The z-stage 124 may be coupled to a base 130 of the tool 100 via a retention means 132. The table 126 may be configured to move in a vertical direction (i.e., a z-direction toward or away from the laser 102) by sliding along rails 128. Since the substrate 110 is attached to the table 126, movement of the table 126 in the z-direction may move the substrate 110 relative to the laser 102.

In use and operation, a layer of powder is formed over the substrate 110 and exposed to laser radiation from the laser 102 to form a layer of the structure being formed. At least one of the laser 102 or the carrier assembly 150 may be coupled to a suitable drive assembly to move in a horizontal (e.g., X-Y) plane in a designated pattern and speed to expose desired portions of the powder layer to the laser radiation. After formation of the layer of the structure, the substrate 110 is moved away from the laser 102 a predetermined distance, which may correspond to a thickness of the previously formed layer. Movement of the substrate 110 relative to the laser 102 may form a cavity defined by the previously formed layer and sidewalls of the aperture 122. Powder is deposited within the cavity by one or more powder delivery nozzles 104 to form a layer of powder over the previously formed layer of the structure in aperture 122. The powder layer within the cavity may be compacted, as will be described herein, and subsequently exposed to laser radiation to form another layer of the structure. Accordingly, the structure may be formed layer by layer.

In some embodiments, a heat source is coupled to at least a portion of the tool 100 (e.g., the aperture plate 120, the substrate 110, or the table 126) to provide heat thereto. The heat source may be configured to heat at least a portion of the tool 100 to about 200° C. In some embodiments, applying external heat to the tool 100 may substantially reduce heat transfer from the powder to surrounding structures during laser irradiation of the powders.

In some embodiments, the tool 100 may be substantially enclosed, such as with an enclosure 140. The enclosure 140 may be substantially free of oxygen or other gases that may oxidize or otherwise react with the powders that form the structure. In some embodiments, the enclosure 140 includes one or more of the shield gases (e.g., argon) and may be maintained at a pressure between about 3.0 millibars and about 7.5 millibars.

Figure 2:
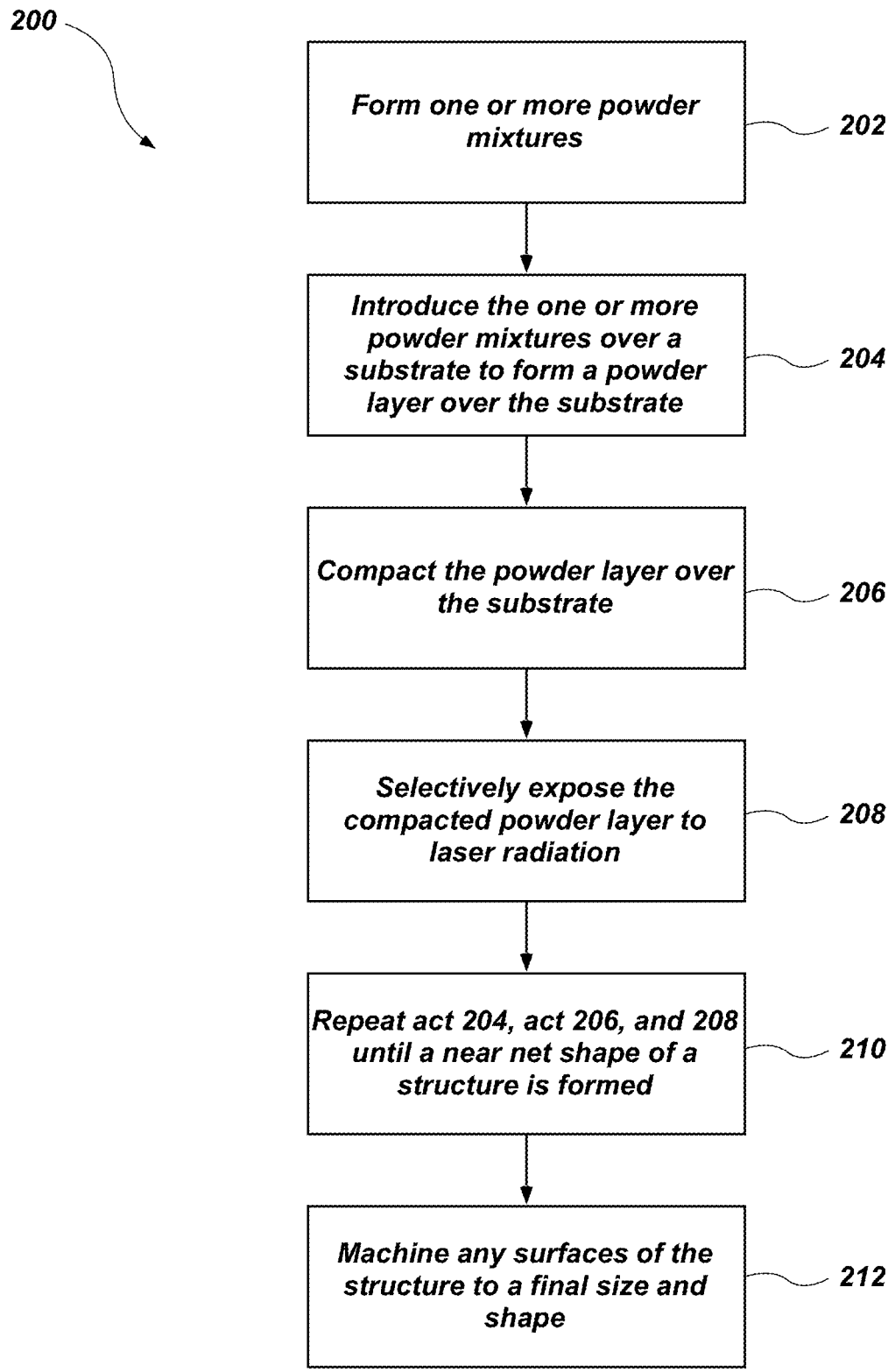
FIG. 2 is a simplified flow diagram of a method of forming a structure, in accordance with embodiments of the disclosure.

FIG. 2 is a simplified flow diagram illustrating a method 200 of forming at least one structure by additive manufacturing, in accordance with embodiments of the disclosure. The method 200 includes act 202 including forming one or more powder mixtures that will be used to additively manufacture the at least one structure; act 204 including introducing the one or more powder mixtures over a substrate to form a powder layer over the substrate; act 206 including compacting the powder layer over the substrate; act 208 including selectively exposing at least a portion of the compacted powder layer to laser radiation, such as portions of the compacted powder layer that are desired to be in the final structure; act 210 including repeating cycles of act 204, act 206, and act 208 until a near net shape of the structure is formed; and act 212 including minor machining of the near net shape to form the final structure having a desired shape and a desired size within acceptable tolerances.

The structure formed according to the method 200 may include one or more of a fuel block, a fuel element, a fuel assembly, one or more components of a reactor core, materials used in furnaces or high-temperature applications, other structures, or combinations thereof. In some embodiments, the structure may comprise a fuel block (e.g., a pellet of low-enriched uranium (LEU) dioxide ($UO_2$)), a fuel element (each of which includes, for example, 12 fuel blocks), a fuel element surrounded by cladding, a fuel rod, at least a portion of a fuel bundle including one or more fuel rods, portions thereof, zirconium dioxide, and combinations thereof. In some embodiments, at least a portion of the structure comprises a fuel block or a fuel element comprising a fissile fuel material dispersed throughout a matrix material (e.g., a graphite matrix material).

Act 202 includes forming one or more mixtures of a powder that will be used to additively manufacture the structure. In some embodiments, a first powder material is mixed with at least a second, different powder material to form a powder mixture including particles of the first powder material substantially homogeneously dispersed throughout particles of the second powder material. In some embodiments, the first powder may comprise a fuel powder and the second powder may comprise a matrix material.

In some embodiments, the fuel powder may comprise any fuel suitable for a nuclear fuel block or a nuclear fuel element, such as, for example, a fissile fuel. By way of nonlimiting example, the fuel powder may comprise low-enriched uranium dioxide ($UO_2$), a uranium oxide (e.g., $U_3O_8$), uranium silicide ($U_3Si_2$), uranium carbide (UC), a highly-enriched uranium oxide, uranium-molybdenum fuels (U—Mo) and alloys thereof, uranium-beryllium ($UBe_x$) and oxides thereof (e.g., $BeO$—$UO_2$), other fissile fuels, and combinations thereof. In some embodiments, the fuel powder comprises uranium dioxide. In some embodiments, the structure formed according to the method 200 may comprise a composite of a graphite matrix material and one or more of the fuels described above. In other words, as will be described herein, the fuel materials may be mixed with graphite to form a graphite matrix material including one or more of the fuels described above.

The matrix material may include graphite. The graphite powder may be substantially pure. Stated another way, substantially all of the carbon atoms in the powder may comprise graphitic carbon atoms.

Particles of the fuel powder may be coated with a material to facilitate inter-granular bonding between particles of the fuel powder and the matrix material. By way of nonlimiting example, particles of the fuel powder may be coated with the matrix material by atomic layer deposition (ALD), chemical vapor deposition (CVD), or other suitable method. In some embodiments, the fuel powder may comprise particles of the fuel surrounded by one or more layers of graphite.

In some embodiments, the powder mixture may comprise or consist essentially of graphite powder and the fuel powder. The powder mixture may be formulated to exhibit a carbon to uranium ratio (i.e., a C:U ratio) between about 700:1 and about 10,000:1, such as between about 700:1 and about 1,000:1, between about 1,000:1 and about 5,000:1, or between about 5,000:1 and about 10,000:1. The carbon to uranium ratio may be controlled by providing a powder including a desired weight percent of the graphite powder and a desired weight percent of the fuel powder.

In some embodiments, the powder may include a cladding material (e.g., cladding for a fuel rod), such as a zirconium-based material (e.g., Zircaloy-2, Zircaloy-3, Zircaloy-4, ZrSn, ZIRLO™, etc.), zirconium dioxide (i.e., zirconia ($ZrO_2$)). In some such embodiments, the powder may include, for example, zirconium, tin, and combinations thereof.

The fuel powder may include particles having a substantially spherical shape and the matrix powder may include particles having a flake-like shape. The fuel powder may have a diameter between about 10 µm and about 100 µm. In some embodiments, the fuel powder has a diameter less than about 50 µm, such as less than about 44 µm. In some embodiments, the matrix powder may have a dimension (e.g., a length) that is larger than a diameter of the fuel powder. In some such embodiments, an average length of flakes of the matrix powder may be greater than about 50 µm or greater than about 100 µm. In other embodiments, the matrix powder may include particles having a spherical shape.

One or more dopants may be added to the powder mixture. The one or more dopants may improve one or more of interlayer bonding between powder layers of the structure, thermal conductivity, electrical conductivity, or one or more additional properties of the structure to be formed. The one or more dopants may include, for example, nanotubes (e.g., single-walled carbon nanotubes, multi-walled carbon nanotubes, or a combination thereof), titanium, vanadium, chromium, iron, cobalt, nickel, copper, zinc, palladium, silver, tin, hafnium, tantalum, tungsten, platinum, gold, lead, another element exhibiting one or more desired properties, or combinations thereof. In some embodiments, the dopant includes carbon nanotubes, zirconium, or a combination thereof. The dopant may be provided to the powder mixture at a concentration between about 1 part per billion (ppb) and about 1,000 ppb, such as between about 1 ppb and about 100 ppb, between about 100 ppb and about 500 ppb, or between about 500 ppb and about 1,000 ppb.

Act 204 includes introducing the one or more powder mixtures over a substrate to form a powder layer over the substrate and over previously formed layers of the structure, if any. In some embodiments, sufficient powder may be provided to the substrate 110 to form a layer having a thickness between about 10 µm to about 5.0 mm, such as between about 10 µm and about 50 µm, between about 50 µm and about 100 µm, between about 100 µm and about 200 µm, between about 200 µm and about 500 µm, between about 500 µm and about 1.0 mm, or between about 1.0 mm and about 5.0 mm. In some embodiments, each layer may have a thickness of about 25 µm.

In some embodiments, the powder may be provided as a premixed powder including the matrix powder and the fuel powder, as described above. In other embodiments, the fuel powder and the matrix powder may be provided to the substrate 110 individually (i.e., through separate powder delivery nozzles 104 (FIG. 1A)), and may be mixed in situ at the time of disposing the powders on the substrate 110.

In some embodiments, the matrix material may constitute between about 97.0 weight percent and about 99.9 weight percent of the powder layer provided to the substrate 110.

The powder mixture may be provided at desired locations over previously formed layers of the structure. The powder may be provided to the desired locations over the substrate 110 such that a cross-sectional profile of the powder layer exhibits a desired cross-sectional composition. By way of nonlimiting example, where the structure includes a fuel assembly surrounded by cladding, the cross-section of the structure may include internal portions of a premixed powder comprising graphite and the fuel powder and surrounding external portions comprising a cladding metal powder (e.g., zircaloy-3, silicon carbide, etc.). In some such embodiments, a cross-sectional profile of the powder layer may exhibit a varying cross-sectional composition. Stated another way, a composition of the powder layer may vary at different locations of the cross-section of the powder layer. By way of nonlimiting example, internal portions of the powder layer may comprise a first composition (e.g., a composition of a fuel assembly), and external portions of the powder layer may comprise a second, different composition (e.g., a composition of cladding).

The powder delivery nozzles 104 (FIG. 1A) may be controlled by a processor having associated therewith a memory including instructions configured to direct each powder delivery nozzle 104 (FIG. 1A) to locations where powder from the respective powder delivery nozzle 104 should be provided. By way of nonlimiting example, the memory may include data for formation of a desired structure in the form of a computer-aided-design (CAD) model or a computer-aided-manufacturing (CAM) model configured to direct the powder delivery nozzles 104.

Act 206 includes compacting the deposited powder layer over the substrate and any previously formed layers of the structure. In some embodiments, act 206 includes scraping off a top portion of the powder layer above the aperture plate 120 such that a top portion of the powder layer is substantially coplanar with a top surface of the aperture plate 120 (FIG. 1A). In some embodiments, act 206 includes packing the deposited layer and substantially reducing a number of voids (e.g., substantially collapsing large pores) between adjacent grains of the deposited powder. It is believed that the compaction process facilitates increasing a density of the matrix material in which fuel powders or other materials are dispersed and increases the density of the final structure.

Any suitable pressure may be employed to form the compacted powder layer. As used herein, the term "compacted" means and includes a powder layer having lesser distances and fewer and smaller voids between particles of the powder in comparison to distances and voids between the particles as initially disposed to form the powder layer. In some embodiments, the compaction process includes compacting the powder layer manually. In other embodiments, the compaction process may include pressing the powder layer over the substrate 110 (FIG. 1A) with a roller, a piston, or other suitable means for applying pressure to the powder layer and substantially compacting the powder layer. In yet other embodiments, vibration may be applied to the substrate 110 to settle the powder layer. Forming the compact from the mixture of the fuel powder and the matrix powder may place the fuel particles and the particles of the matrix material in intimate contact to be bonded when exposed to the laser radiation.

Act 208 includes exposing at least portions of the compacted powder layer to laser radiation to form inter-granular bonds between adjacent particles of the compacted powder layer and underlying layers of the structure previously formed. The laser radiation may provide localized heating of portions of the compacted powder layer that are exposed thereto. In some embodiments, the resulting structure comprises the fuel material dispersed throughout the matrix material. At least one of the laser 102 (FIG. 1A) and the carrier assembly 150 (FIG. 1A) may be operably coupled to the processor and associated memory including instructions to move one or both of the laser 102 and the carrier assembly 150 in the X-Y plane to enable direction of the laser 102 to locations of the powder layer to be exposed to laser radiation from the laser 102.

In some embodiments, the laser 102 (FIG. 1A) may be defocused to expose larger areas of the powder layer to defocused laser radiation. The laser may be defocused by altering a distance of the laser 102 from the surface of the compacted powder layer or by moving a location of the lens 108 (FIG. 1A) of the laser 102. Accordingly, the energy to which the powder layer is exposed may be dispersed over a larger area compared to a focused laser, as is employed in conventional selective laser sintering tools.

In some embodiments, the laser is defocused such that the spot size of the laser is between about 0.5 mm and about 10.0 mm, such as between about 0.5 mm and about 1.0 mm, between about 1.0 mm and about 5.0 mm, or between about 5.0 mm and about 10.0 mm. In some embodiments, the spot size of the laser is about 5.0 mm. In other embodiments, the spot size of the laser is about 1,000 μm. The spot size may be adjusted depending on the composition of the powder that makes up the compacted powder layer, a particle size of the powder, and an exposure time of the powder to the defocused laser radiation. In other words, an energy to which the powder is exposed may depend, at least in part, on the material characteristics of the powder, the particle size of the powder (i.e., an exposed surface area of the powder), a duration of time during which the powder is exposed to the radiation, and a spot size of the defocused laser radiation. In some embodiments, the spot size may be between about 200% and about 2,000% of a spot size of focused laser radiation. Stated another way, for laser radiation with a focused spot size of about 0.5 mm, the spot size may be between about 1.0 mm (i.e., about 200% of the focused spot size) and about 10.0 mm (i.e., about 2,000% of the focused spot size).

In some embodiments, defocusing the laser may comprise increasing a beam divergence of the laser radiation. The beam divergence may be an angular measure of an increase in beam diameter or radius with distance from the lens 108 (FIG. 1A) from which the beam emerges, as known in the art. The beam divergence may be varied, for example, between about 5 milliradians (mrad) and about 100 mrad.

In some embodiments, the laser radiation may be configured to penetrate the compacted powder layer to a depth between about 250 μm and about 1,000 μm, depending on an intensity of the laser 102 (FIG. 1A), which may be selected to provide a desired degree and depth of exposure of the powder layer and any underlying materials of a previously formed layer of the structure.

A total energy to which the powder layer is exposed may depend, at least in part, on a distance between the laser 102 (FIG. 1A) and the powder layer, a time of exposure of the powder layer to the laser 102, an intensity of the laser 102, and a degree to which the laser 102 is defocused (e.g., a beam divergence of the laser).

The laser 102 (FIG. 1A) may be any suitable laser 102 configured to provide energy in the form of laser radiation to the compacted powder layer. In some embodiments, the laser 102 is configured to provide electromagnetic radiation having a substantially monochromatic wavelength. The laser 102 may comprise, by way of example, a helium-neon laser, an argon laser, a krypton laser, a xenon ion laser, a nitrogen laser, a carbon dioxide laser, a carbon monoxide laser, an excimer laser, a fiber laser, or a combination thereof. However, the laser 102 is not so limited and the laser may comprise any laser suitable to provide sufficient energy to the powder layer to form bonds therein. The laser 102 may be configured to operate over a range of powers. For example, the laser may be configured to provide electromagnetic energy between about 1 kW and about 5 kW, such as a 1 kW laser, a 2 kW laser, a 3 kW laser, a 4 kW laser, or a 5 kW laser. However, lasers having different powers may be used and the disclosure is not limited by the type of laser which may be used. In some embodiments, a power of the laser may be reduced such that the powder layer is exposed to between about 5 W and about 60 W, such as between about 5 W and about 15 W, between about 15 W and about 25 W, between about 25 W and about 40 W, or between about 40 W and about 60 W.

Without wishing to be bound by any particular theory, it is believed that exposing the compacted powder layer to defocused laser radiation forms inter-granular bonds of the powder layer at a lower temperature compared to focused laser radiation because an energy profile of the defocused laser radiation is dispersed over a broader area than an area of the powder layer that would be exposed by focused laser radiation. The lower temperatures to which the powder layer is exposed may reduce a likelihood of undesirable chemical reactions between the materials of the compacted powder layer (e.g., between the fuel powder and the matrix powder). By way of nonlimiting example, a uranium oxide fuel material may react with a graphite matrix material to form uranium carbide (e.g., UC) when exposed to local temperatures exceeding about 1,400° C. In some embodiments, a local temperature of the powder exposed to the defocused laser radiation may be below about 1,000° C. In addition, it is believed that the lower temperature substantially reduces a likelihood of vaporization of the materials of the compacted powder layer (e.g., graphite), which are often vaporized during conventional additive manufacturing processes. Further, the lower temperature may substantially reduce a risk of vaporizing uranium oxide, the vaporization of which may result in catastrophic consequences.

The defocused laser radiation may form inter-granular bonds between particles of the compacted powder layer without substantially melting the powder, as is the case in conventional additive manufacturing processes. The defocused laser radiation may facilitate formation of inter-granular bonds and solid state diffusion of materials of the powder layer to form a layer of the structure.

Act 210 includes sequentially repeating act 204, act 206, and act 208 until a desired near net shape of the structure is formed. After exposing the powder layer to laser radiation to form a layer of the structure, the substrate 110 (FIG. 1A) may be moved a predetermined distance from the laser 102 (FIG. 1A), which may correspond to a thickness of the layer of the structure previously formed. The substrate 110 may be moved relative to the laser 102 such as by, for example, moving the z-stage 124 (FIG. 1B) and associated table 126 (FIG. 1B) on which the substrate 110 is disposed. Moving the substrate 110 downward relative to the laser 102 may form a cavity defined by the previously formed layer of the structure and the sidewalls defining the aperture 122 (FIG. 1A). Another powder layer may be formed over the previously formed layer of the structure in the cavity. The powder layer may exhibit the same or a different cross-sectional composition as previously formed powder layers. For example, where the structure being formed comprises a fuel block, adjacent layers may have substantially, a similar cross-sectional composition.

After deposition of a new layer of the powder material in the cavity and over previously formed layers, the newly deposited powder layer may be compacted, similar to act 206 described above, to form a compacted powder layer overlying the previously formed layers. The compacted powder layer may be exposed to defocused laser radiation, similar to act 208 described above.

The structure may be formed layer by layer to form a structure exhibiting a near net shape that substantially corresponds to a desired near net shape of a final structure. For example, the structure may exhibit a near net shape of a fuel block, a fuel element (e.g., a fuel rod including fuel pellets substantially surrounded by cladding), a fuel assembly, one or more parts of a nuclear reactor core, another structure, or combinations thereof.

Act 212 may include minor machining of the near net shape to form the final structure. The machining process may include modifying at least one or more dimensions of the structure to form a machined structure exhibiting a desired shape and a desired size. As one nonlimiting example, peripheral portions of the structure may be removed (e.g., ground, etched, etc.) to provide a machined structure exhibiting a diameter and a height suitable for a desired application (e.g., a desired LWR application).

By way of nonlimiting example, the machining process may include subjecting the structure to a centerless grinding process to form the machined structure exhibiting a desired diameter and a desired height. In some embodiments, the centerless grinding process includes inserting the structure onto a guide and exposing a portion of a peripheral sidewall of the structure, moving and rotating (e.g., spinning) the structure along the guide using a feed wheel, and removing a portion of the peripheral sidewall using a grinding wheel (e.g., a diamond resin grinding wheel) operatively associated with the guide. The grinding wheel may remove (e.g., grind) a portion of the peripheral sidewall of the structure during each pass of the structure across the grinding wheel. The amount of the final structure removed by the grinding wheel during each pass may be controlled to achieve the desired diameter of the machined structure. The removal (e.g., grinding) rate of the grinding wheel in terms of a depth of material removed during each pass of the grinding wheel may be substantially constant, or may be varied. The removal rate of the grinding wheel may, for example, be decreased as the desired diameter of the machined structure is approached. After removal of any materials desired to be removed from the structure, the structure may be formed to a desired size and a desired shape.

Structures formed with the methods described herein may include fuel materials embedded or otherwise disposed within a matrix material (e.g., a graphite matrix material). In some embodiments, the structures may comprise, consist essentially of, or consist of the fuel materials and the graphitic matrix material. By way of nonlimiting example, the structure may comprise a uranium dioxide fuel dispersed in a graphite matrix material. In other embodiments, the structures may include zirconium dioxide, a cladding material, one or more components of a reactor core, other structures, or combinations thereof.

A graphite to total carbon ratio of the final structure may be equal to about 1.0:1.0. In other words, substantially all of the carbon in the structure may comprise graphite. By way of comparison, structures formed by extrusion or compaction and sintering may exhibit a graphite to total carbon ratio of between about 0.72:1.0 and about 0.90:1.0 and may, therefore, exhibit a lower purity and a reduced thermal conductivity in comparison to structures formed according to the methods described herein.

In some embodiments, the structure may exhibit a higher density, a higher thermal conductivity, and a reduced porosity in comparison to structures formed by conventional powder metallurgical manufacturing methods. By way of nonlimiting example, the structures may exhibit a porosity between about 0.01 and about 0.05. As used herein, the term "porosity" means and includes a volume of void space in a material divided by a total volume (including solid and void component) of the material. In addition, as a result of exposure to defocused laser radiation, the structures may exhibit direct particle to particle bonding of the matrix material and fuel material, or any other powder materials constituting the structure. The structures may include particles of, for example, the fuel material, dispersed throughout a matrix material, similar to a structure formed by solid state diffusion, solid state sintering, or liquid state sintering. In some embodiments, a thermal conductivity of a structure formed by the methods described herein and including graphite may be as much as about 10% greater than a thermal conductivity of a structure formed by conventional powder metallurgical manufacturing methods.

Although the method 200 (FIG. 2) has been described as including forming structures including a mixture of powders (e.g., the fuel powder and a graphite powder), the disclosure is not so limited. In other embodiments, the structure may comprise only uranium dioxide, only graphite, zirconium dioxide, another powder material, or combinations thereof. By way of nonlimiting example, in some embodiments, a graphite material may be formed according to the method 200. By way of nonlimiting example, in some embodiments, the powder material (i.e., the powder mixture described above with reference to act 202 and act 204) may comprise or consist essentially of graphite and may not include a fuel material and the resulting structure may comprise or consist essentially of graphite. In other embodiments, the powder material may comprise or consist essentially of particles of uranium oxide (e.g., particles of uranium dioxide). In some such embodiments, a structure consisting essentially of uranium oxide may be formed with the method 200 described above with reference to FIG. 2.

Although the method 200 (FIG. 2) has been described as including forming structures without a binder material, the disclosure is not so limited. In some embodiments, one or more binder materials may be used during the method 200. By way of nonlimiting example, act 202 may include forming one or more powder mixtures, wherein the powder mixture includes a binder and one or both of a fuel powder and a powder comprising a matrix material (e.g., graphite). The binder material may include, by way of nonlimiting example, a high molecular weight material, such as a high molecular weight poly(ethylene oxide), a coal tar pitch (CTP) material, one or more phenolic resins, a phenol-formaldehyde novolac resin, other binder materials, or combinations thereof.

In some embodiments, the structure formed according to the embodiments described herein may include, for example, one or more layers having a different composition than an adjacent layer. By way of nonlimiting example, in some embodiments, a first layer of a structure may include a first material and a second layer of the structure overlying the first layer may include a second material, the second material having a different composition than the first material. The structure may comprise, for example, alternating layers of the first material and the second material. The first material may comprise one of a metal (e.g., one or more metals such as titanium, zirconium, hafnium, vanadium, tantalum, chromium, tungsten, iron, ruthenium, cobalt, nickel, palladium, platinum, copper, silver, gold, zinc, indium, an alloy, or another metal), a ceramic, graphite, or a composite material (e.g., a fuel material dispersed in a matrix material (e.g., graphite)) and the second material may comprise another of the metal, the ceramic, graphite, or the composite material. In some embodiments, the first material comprises a ceramic material and the second material comprises a metal material. In other embodiments, the first material comprises graphite or a fuel material dispersed in a graphite matrix material and the second material comprises a metal or a ceramic material. In some such embodiments, a first powder delivery nozzle 104 (FIG. 1A) may be configured to provide a first powder having a first composition and at least a second powder delivery nozzle 104 may be configured to provide at least a second powder having a second composition. Accordingly, in some embodiments, a structure may include alternating layers, one or more layers comprising a different material or a different composition than an adjacent layer.

Figure 3:
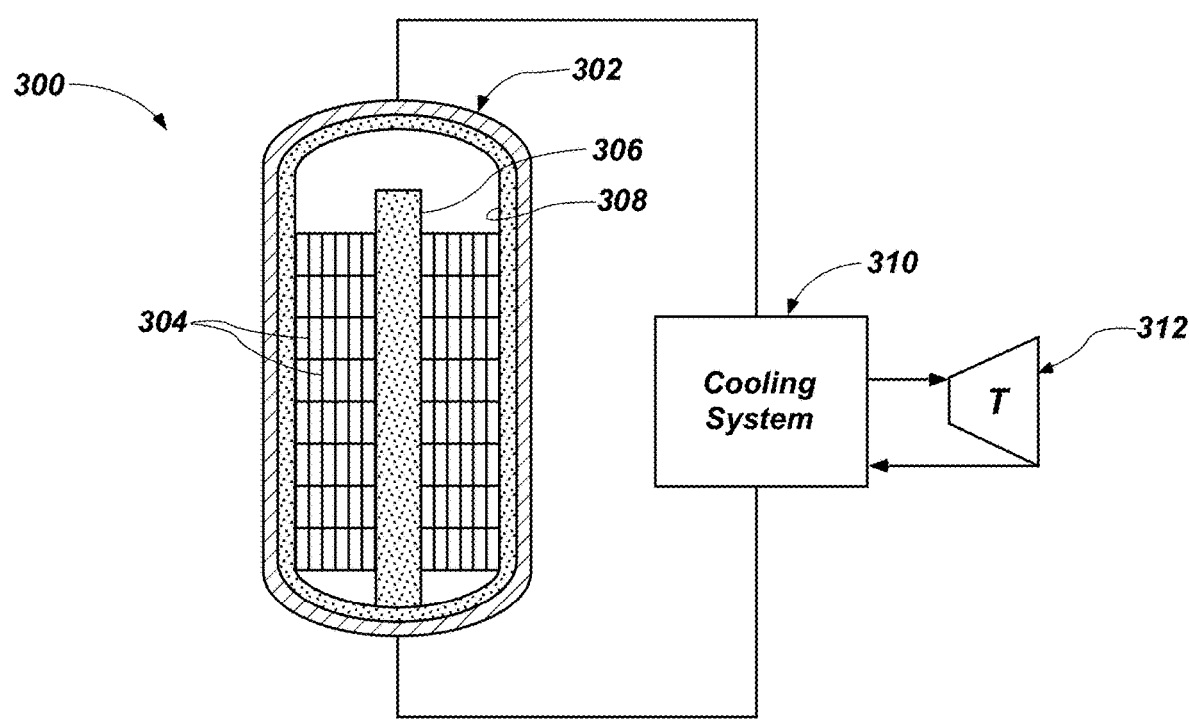
FIG. 3 is a simplified schematic view of a nuclear reactor system, in accordance with embodiments of the disclosure.

FIG. 3 is a simplified schematic of a nuclear reactor system 300 including one or more elements or structures that may be formed by the methods described herein. The nuclear reactor system 300 includes a reactor core 302 including a plurality of fuel elements 304 that may be formed according to the methods described herein. The fuel elements 304 may include, for example, a fuel material (e.g., $UO_2$) embedded within a graphite matrix material. In some embodiments, a cladding material substantially surrounds and encapsulates each of the individual fuel elements 304. The fuel elements 304 may substantially surround a central graphite reflector 306 disposed within the center of the reactor core 302. The fuel elements 304 may be surrounded by an internal graphite reflector 308 that is disposed around internal surfaces of the reactor core 302. A cooling system 310 may be operably coupled to the reactor core 302 and to a turbine 312 configured to convert heat from the cooling system 310 to mechanical energy or electricity using methods known by those of ordinary skill in the art and, therefore, not described in detail herein. One or more of the reactor core 302, the fuel elements 304, the central graphite reflector 306, and the internal graphite reflector 308 may be formed according to methods described herein.

Figure 4:
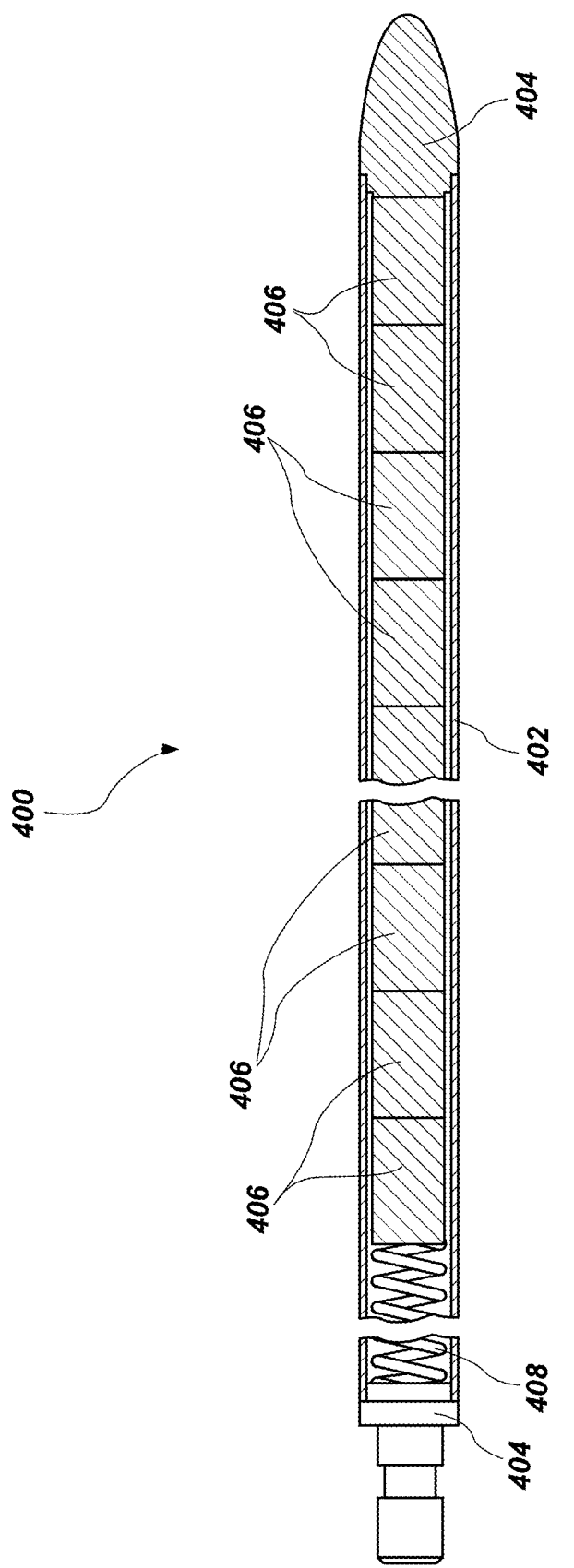
FIG. 4 is a longitudinal, cross-sectional view of a fuel rod for use in a nuclear reactor, such as a light-water reactor (LWR), in accordance with embodiments of the disclosure.

FIG. 4 is a longitudinal, cross-sectional view of a fuel rod 400 in accordance with embodiments of the disclosure. The fuel rod 400 may include a cladding tube 402 including caps 404 at opposing ends thereof and including fuel blocks 406 (e.g., pellets of $UO_2$) stacked within the hollow cladding tube 402. The cladding tube 402 may be formed of and include a cladding material such as a zirconium-based alloy (e.g., Zircaloy-2, Zircaloy-3, Zircaloy-4, ZrSn, ZIRLO™, etc.) suitable for cladding fissile material structures. The fuel blocks 406 may be biased against one another by way of a spring 408 located at one of the ends of the cladding tube 402. Each of the fuel blocks 406 may independently be formed in accordance with the method previously described herein with respect to FIG. 2. In other embodiments, one or more portions, or substantially an entirety of, the fuel rod 400 may be formed in accordance with the method previously described with respect to FIG. 2.

Figure 5:
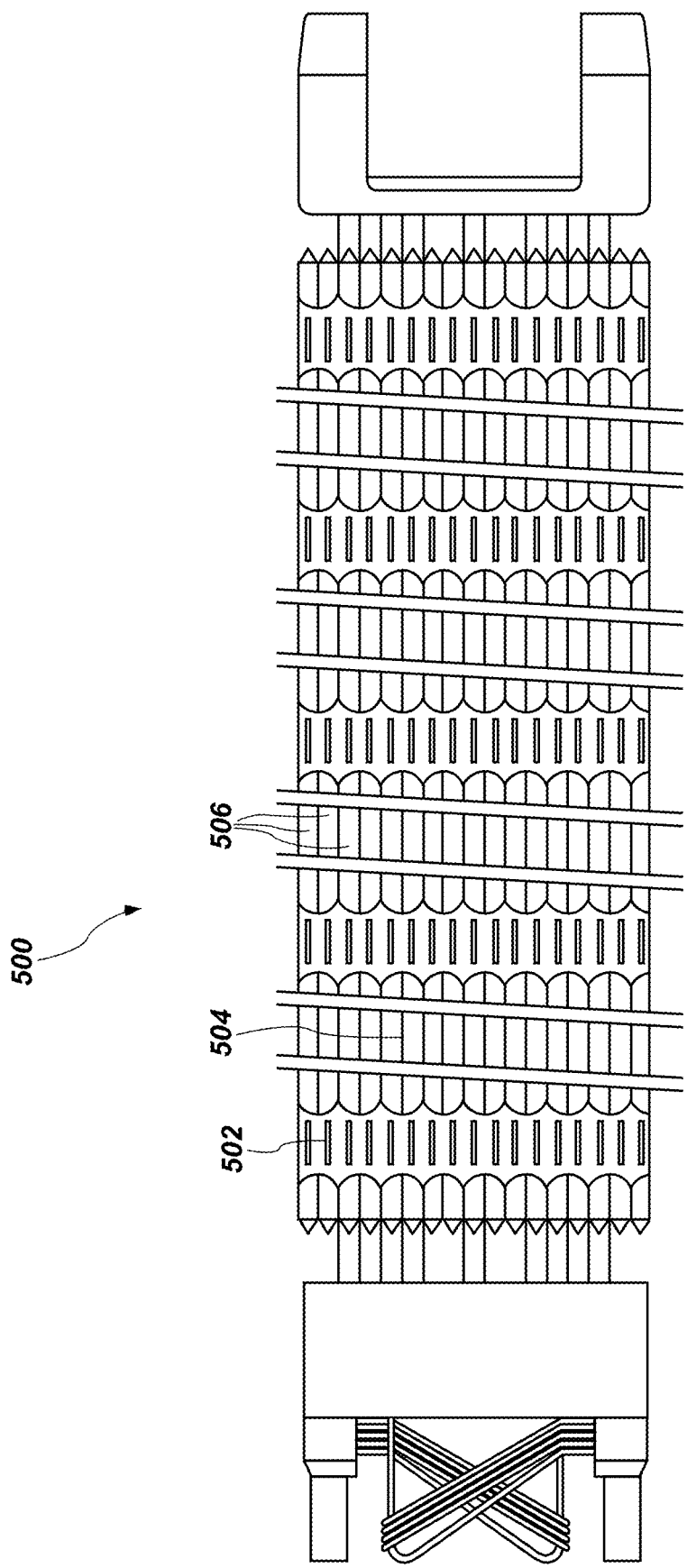
FIG. 5 is a longitudinal cross-sectional view of a fuel assembly for use in a nuclear reactor, in accordance with embodiments of the disclosure.

FIG. 5 is a longitudinal schematic view of a fuel assembly 500, in accordance with embodiments of the disclosure. The fuel assembly 500 may be configured for use in, for example, a light-water reactor (LWR), such as a pressurized water reactor (PWR). The fuel assembly 500 may include a frame 502, and bundles 504 of fuel rods 506 supported by the frame 502. One or more of the fuel rods 506 may be substantially similar to the fuel rod 400 previously described herein with reference to FIG. 4. One or more portions of the fuel assembly 500 may be formed in accordance with the method previously described with respect to FIG. 2.

Figure 6:
FIG. 6 is a picture of a structure including a fissile fuel material dispersed in a graphitic matrix, formed according to the methods described herein.

FIG. 6 is a picture of a structure formed according to the methods described herein. The structure was formed by forming a powder mixture including particles of flake-shaped graphite and particles of a fissile fuel material and forming a layer of the structure according to the method described above with reference to FIG. 2. The structure included about 30 layers of material and had a thickness of about 5 mm. The structure included the fissile fuel material dispersed through a graphite matrix material, exhibited a lower porosity, a greater density, and a higher graphitic carbon to total carbon ratio in comparison to structures formed by conventional additive manufacturing methods.

In some embodiments, structures formed according to the method described herein with reference to FIG. 2 may be formed without a resin or binder material. Such structures may include a matrix material comprising an increased weight percent of graphite than structures formed by extrusion or sintering, since the resins or binders used in such processes include non-graphitic carbon. The structures may exhibit a greater density than a density of structures formed by extrusion or sintering. In addition, the structures formed according to embodiments described herein may be substantially free of non-graphitic carbon and may exhibit a graphite to total carbon ratio of about 1.0:1.0 and may, therefore, exhibit an improved neutronic performance and an increased thermal conductivity compared to structures that include binder or resin materials.

Figure 7:
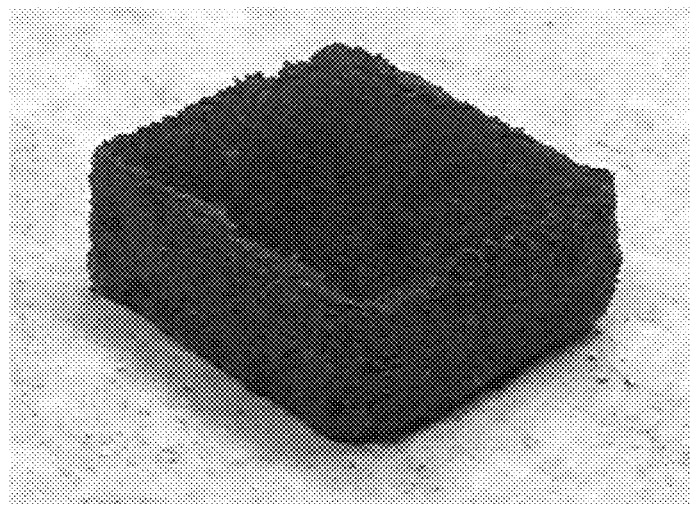
FIG. 7 is a picture of another structure comprising zirconium dioxide formed according to the methods described herein.

FIG. 7 is a picture of a structure formed according to the methods described herein, wherein the powder mixture included a first powder comprising spherical particles of graphite and a second powder comprising spherical particles of zirconium dioxide. The structure included about 44.4 weight percent (wt. %) graphite, about 44.4 wt. % zirconium dioxide, and about 11.1 wt. % binder. The binder comprised a phenolic resin. The structure was about 10 mm wide, about 10 mm long, and about 5 mm tall.

Figure 8:
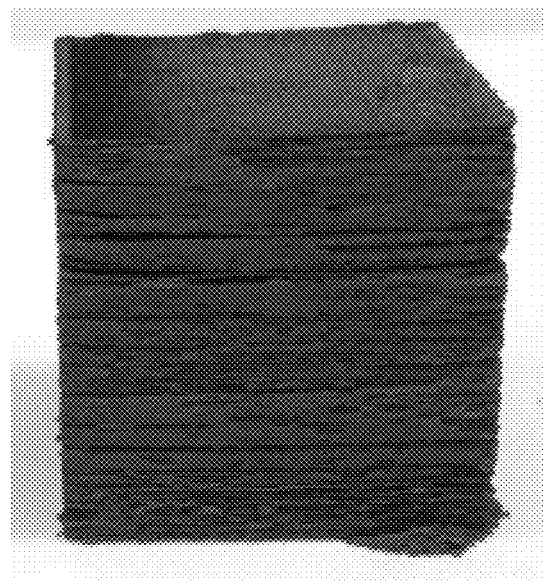
FIG. 8 is a picture of a structure comprising graphite formed according to the methods described herein.

FIG. 8 is a picture of a structure comprising graphite formed according to the methods described herein. The structure consisted essentially of graphite and was formed without a binder. The powder included spherical particles of graphite. The structure had a width of about 6 cm, a length of about 6 cm, and a height of about 8 cm.

Figure 9:
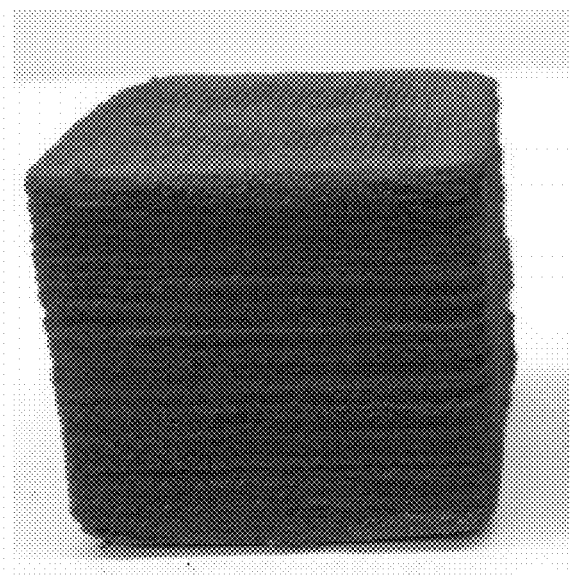
FIG. 9 is a picture of a structure comprising graphite and a binder material, formed according to the methods described herein.

FIG. 9 is a picture of a structure comprising graphite formed according to the methods described herein. The structure included graphite and a binder material. The binder was a phenolic resin and the graphite powder included spherical particles of graphite. The structure had a width of about 6 cm, a length of about 6 cm, and a height of about 8 cm. The structure including the resin binder material exhibited less surface roughness (e.g., more smoothness) than the structure not including the binder material described above with reference to FIG. 8.

Since the structures exhibit an increased thermal conductivity, use of the structures in a reactor core, such as in a fuel block or fuel element, may reduce an operating temperature of the reactor core. A lower operating temperature of the reactor core may facilitate use of a broader range of materials for reactor core components (e.g., grid plates, filters, handling equipment, etc.). Similarly, the increased thermal conductivity of one or more of the fuel blocks, fuel elements, or fuel assemblies may reduce an operating temperature of cladding surrounding such structures. As a result, the cladding materials may exhibit a reduced tendency to corrode at the reduced operating temperatures. In addition, lower fuel temperatures (and, therefore, lower reactor core temperatures), may reduce a potential of a runaway (or supercritical) reaction in a severe accident scenario.

It is contemplated that the methods described herein may be used to form demonstration fuel elements, lead test assemblies (LTAs), and production fuel elements for use in a reactor core. For example, facilities introducing a new fuel into a reactor core may initiate a lead test assembly program that includes placing six or more fuel assemblies in a non-limited core power location. Placing a limited number of lead test assemblies into an operating core may be a method of obtaining in-reactor experience.

In some embodiments, the methods described herein may be suitable for replacing one or more materials of an article with graphite, another material, or combination of materials exhibiting one or more desired properties. As only one example, components of a gun conventionally formed with metals may be formed with graphite using the methods described herein. As another example, one or more components of a vehicle may be replaced with more graphite according to the methods described herein. In yet another example, in the aerospace industry, one or more components of a space vehicle, such as space shuttles, rockets, satellites, missiles, etc., may be formulated to include graphite according to methods described herein. In other embodiments, metals may be replaced where metals are undesired, such as in instances where it is desired to reduce a weight of a structure, reduce electromagnetic interactions (such as in aerospace structures), etc.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of forming a fissile fuel structure by additive manufacturing, the method comprising:
    introducing a first layer of a powder mixture comprising graphite and a fuel on a surface of a substrate, the powder mixture comprising a higher weight percent of graphite than of the fuel;
    at least partially compacting the first layer;
    exposing the first layer of the powder mixture to laser radiation to form a first layer of material comprising the fuel dispersed within a graphite matrix material;
    forming a second layer of the powder mixture over the first layer of material; and
    exposing the second layer of the powder mixture to laser radiation to form a second layer of material comprising the fuel dispersed within a graphite matrix material and to form inter-granular bonds between the second layer and the first layer.

2. The method of claim 1, further comprising selecting the powder mixture such that graphite constitutes between about 97.0 weight percent and about 99.9 weight percent of the powder mixture.

3. The method of claim 1, further comprising selecting the powder mixture to comprise graphite and a uranium-containing material.

4. The method of claim 1, further comprising selecting the powder mixture to consist essentially of graphite and a uranium oxide.

5. The method of claim 1, further comprising selecting the fuel to comprise uranium oxide particles coated with graphite.

6. The method of claim 1, further comprising selecting the powder mixture to comprise a graphite to total carbon ratio of about 1.0:1.0.

7. The method of claim 1, wherein exposing the first layer and the second layer of the powder mixture to laser radiation comprises exposing at least one of the first layer and the second layer to defocused laser radiation.

8. The method of claim 1, further comprising selecting the fuel to comprise uranium silicide, uranium carbide, or a combination thereof.

9. The method of claim 1, further comprising providing a powder of a cladding material substantially around a circumference of at least one of the first layer of the powder mixture and the second layer of the powder mixture and exposing the powder of the cladding material to laser radiation.

10. The method of claim 1, wherein exposing the first layer and the second layer of the powder mixture to laser radiation comprises exposing the first layer and the second layer to the laser radiation in an inert atmosphere.

11. The method of claim 1, further comprising moving the substrate away from the laser prior to forming the second layer of the powder mixture over the first layer of material.

12. The method of claim 1, wherein introducing a first layer of a powder mixture comprising graphite and a fuel on a surface of a substrate comprises forming the first layer of the powder mixture to a thickness between about 0.1 mm and about 5.0 mm.

13. The method of claim 1, further comprising providing a dopant to the powder mixture at a concentration between about 1 ppb and about 1,000 ppb.

14. The method of claim 1, wherein exposing the first layer to laser radiation comprises exposing the first layer to laser radiation after at least partially compacting the first layer of the powder mixture.

15. The method of claim 1, further comprising heating the substrate prior to introducing the first layer of the powder mixture on the surface of the substrate.

16. A method of forming a structure, the method comprising:
    providing a substrate within an enclosure;
    disposing a powder on the substrate, disposing the powder on the substrate comprising forming a powder layer comprising a varying composition at different cross-sectional locations of the powder layer on the substrate;
    exposing the powder on the substrate to defocused laser radiation to form a first layer of a structure;
    disposing additional powder over the first layer; and
    exposing the additional powder over the first layer to defocused laser radiation.

17. The method of claim 16, further comprising selecting the powder to comprise a matrix material and at least another material.

18. The method of claim 17, further comprising selecting the matrix material to comprise graphite.

19. The method of claim 18, further comprising selecting the at least another material to comprise particles of a uranium-containing material coated with graphite.

20. The method of claim 17, further comprising selecting the powder to comprise a carbon to uranium ratio between about 700:1 and about 10,000:1.

21. The method of claim 16, further comprising adding at least one dopant selected from the group consisting of nanotubes and zirconium to the powder.

22. The method of claim 16, wherein disposing a powder on the substrate comprises disposing the powder on the substrate from a single powder delivery nozzle.

23. The method of claim 16, wherein disposing a powder on the substrate comprises disposing a matrix material from a first powder delivery nozzle and disposing at least another material from a second powder delivery nozzle on the substrate.

24. The method of claim 16, further comprising selecting a duration of time that the powder is exposed to the defocused laser radiation based on one or more of a particle size of the powder, a composition of the powder, or a spot size of the defocused laser radiation.

25. The method of claim 16, wherein forming a powder layer comprising a varying composition at different cross-sectional locations of the powder layer comprises forming a first composition at internal locations of the powder layer and a second composition around a circumference of the first composition.

26. The method of claim 25, further comprising selecting the first composition to comprise a fuel material and selecting the second composition to comprise a cladding material.

27. The method of claim 1, wherein introducing a first layer of a powder mixture comprising graphite and a fuel on a surface of a substrate comprises introducing, on the surface of the substrate, a first layer of a powder mixture comprising graphite, a fuel, and at least one dopant selected from the group consisting of nanotubes, titanium, vanadium, chromium, iron, cobalt, nickel, copper, zinc, palladium, silver, tin, hafnium, tantalum, tungsten, platinum, gold, or lead.

28. The method of claim 1, further comprising forming a third layer of a powder mixture over the second layer, the third layer of the powder mixture comprising one of a metal and a ceramic material.

29. The method of claim 1, wherein exposing the first layer of the powder mixture to laser radiation comprises exposing the first layer of the powder to defocused laser radiation having a spot size between about 1 mm and about 10 mm.

30. The method of claim 1, wherein exposing the second layer of the powder mixture to laser radiation to form a second layer of material comprising the fuel dispersed within a graphite matrix material and to form inter-granular bonds between the second layer and the first layer comprises forming the fissile fuel structure to have a porosity between about 0.01 and about 0.05.

31. The method of claim 1, wherein introducing a first layer of a powder mixture comprising graphite and a fuel on a surface of a substrate comprises introducing, on the surface of the substrate, a first layer of a powder mixture having a carbon to uranium ratio between about 700:1 and about 10,000:1.

32. A method of forming a fissile fuel structure by additive manufacturing, the method comprising:
   introducing a first layer of a powder mixture comprising graphite and a fuel on a surface of a substrate, wherein the graphite constitutes between about 97.0 weight percent and about 99.9 weight percent of the powder mixture;
   at least partially compacting the first layer;
   exposing the first layer of the powder mixture to laser radiation to form a first layer of material comprising the fuel dispersed within a graphite matrix material;
   forming a second layer of the powder mixture over the first layer of material; and
   exposing the second layer of the powder mixture to laser radiation to form a second layer of material comprising the fuel dispersed within a graphite matrix material and to form inter-granular bonds between the second layer and the first layer.

33. A method of forming a fissile fuel structure by additive manufacturing, the method comprising:
   introducing a first layer of a powder mixture comprising graphite and a fuel on a surface of a substrate, the powder mixture comprising a graphite to total carbon ratio of about 1.0:1.0;
   at least partially compacting the first layer;
   exposing the first layer of the powder mixture to laser radiation to form a first layer of material comprising the fuel dispersed within a graphite matrix material;
   forming a second layer of the powder mixture over the first layer of material; and
   exposing the second layer of the powder mixture to laser radiation to form a second layer of material comprising the fuel dispersed within a graphite matrix material and to form inter-granular bonds between the second layer and the first layer.

* * * * *